(12) United States Patent
Gutierrez

(10) Patent No.: US 10,152,906 B2
(45) Date of Patent: Dec. 11, 2018

(54) NEAR-EYE DISPLAY SYSTEM AND METHOD

(71) Applicant: MEMS START, LLC, Arcadia, CA (US)

(72) Inventor: Roman Gutierrez, Arcadia, CA (US)

(73) Assignee: MEMS START, LLC, Arcadia, CA (US)

( * ) Notice: Subject to any disclaimer, the term of this patent is extended or adjusted under 35 U.S.C. 154(b) by 325 days.

(21) Appl. No.: 14/936,226

(22) Filed: Nov. 9, 2015

(65) Prior Publication Data

US 2016/0314729 A1 Oct. 27, 2016

Related U.S. Application Data

(60) Provisional application No. 62/152,893, filed on Apr. 26, 2015.

(51) Int. Cl.
| | | |
|---|---|---|
| G06T 15/00 | (2011.01) | |
| G02B 7/28 | (2006.01) | |
| G09G 3/02 | (2006.01) | |
| G06F 3/01 | (2006.01) | |
| H02N 1/00 | (2006.01) | |
| G02B 27/01 | (2006.01) | |
| G09G 5/12 | (2006.01) | |
| G09G 3/00 | (2006.01) | |

(52) U.S. Cl.
CPC .......... *G09G 3/02* (2013.01); *G02B 27/0172* (2013.01); *G02B 27/0176* (2013.01); *G06F 3/013* (2013.01); *G09G 3/001* (2013.01); *G09G 3/003* (2013.01); *G09G 5/12* (2013.01); *H02N 1/008* (2013.01); *G02B 2027/014* (2013.01); *G02B 2027/015* (2013.01); *G02B 2027/0138* (2013.01); *G02B 2027/0154* (2013.01); *G09G 2340/0407* (2013.01); *G09G 2340/0457* (2013.01); *G09G 2340/145* (2013.01); *G09G 2354/00* (2013.01); *G09G 2360/145* (2013.01)

(58) Field of Classification Search
None
See application file for complete search history.

(56) References Cited

U.S. PATENT DOCUMENTS

| | | | | |
|---|---|---|---|---|
| 5,281,960 | A | * | 1/1994 | Dwyer, III ............. G09G 3/002 345/31 |
| 2004/0085292 | A1 | | 5/2004 | Spitzer et al. |
| 2012/0293407 | A1 | * | 11/2012 | Lee ...................... G02B 27/017 345/156 |
| 2014/0267420 | A1 | | 9/2014 | Schowengerdt et al. |
| 2015/0077312 | A1 | | 3/2015 | Wang |
| 2015/0277121 | A1 | * | 10/2015 | Fridental ............ G02B 27/0101 348/54 |

OTHER PUBLICATIONS

Patent Cooperation Treaty, International Search Report for PCT/US2016/029371, dated Sep. 14, 2016, pp. 1-4.

* cited by examiner

*Primary Examiner* — Andrew G Yang
(74) *Attorney, Agent, or Firm* — Sheppard Mullin Richter & Hampton LLP

(57) ABSTRACT

A near-eye light field display for use with a head mounted display unit with enhanced resolution and color depth. A display for each eye is connected to one or more actuators to scan each display, increasing the resolution of each display by a factor proportional to the number of scan points utilized. In this way, the resolution of near-eye light field displays is enhanced without increasing the size of the displays.

21 Claims, 9 Drawing Sheets

NEAR-EYE DISPLAY SYSTEM AND METHOD

TECHNICAL FIELD

The disclosed technology relates generally to near-eye displays, and more particularly, some embodiments relate to near-eye displays with reduced size and improved resolution and color.

DESCRIPTION OF THE RELATED ART

Head-mounted displays ("HMDs") are generally configured such that one or more displays are placed directly in front of a person's eyes. HMDs have been utilized in various applications, including gaming, simulation, and military uses. Traditionally, HMDs have comprised heads-up displays, wherein the user focuses on the display in front of the eyes, as images are traditionally displayed on a two-dimensional ("2D") surface. Optics are used to make the display(s) appear farther away than it actually is, in order to allow for a suitable display size to be utilized so close to the human eye. Despite the use of optics, however, HMDs generally have low resolution because of trade-offs related to the overall weight and form factor of the HMD, as well as pixel pitch.

BRIEF SUMMARY OF EMBODIMENTS

According to various embodiments of the disclosed technology, an improved near-eye display with enhanced resolution is provided. The near-eye display system includes a display component comprising a light source array disposed on one or more actuators; an actuator control component communicatively coupled to the one or more actuators; and a processor unit communicatively coupled to the light source array and that actuator control component, wherein the light source array is connected with the one or more actuators such that the one or more actuators are capable of moving the light source array in accordance with a scan pattern, and the processor unit is configured to synchronize the illumination of a plurality of pixels of the light source array with the scan pattern. In some embodiments, more than one display components may be implemented in a HMD.

According to an embodiment of the disclosed technology, a method of providing a near-eye light field display with enhanced resolution is provided. The method includes measuring by one or more focus sensors an eye focus of a user's eyes; determining by a focus correction modules a desired focus based on the measured eye focus; setting a focus of a first camera and a second camera based on the desired focus; capturing images within a field of view of the first camera and the second camera; processing the captured images; setting a focus of a first display and a second display; and providing the captured images to the first display and a second display; wherein the first display is disposed in front of a first eye of the user and the second display is disposed in front of a second eye of the user.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

As discussed above, HMDs generally employ one or more displays placed in front of the human eye. 2D images are shown on the displays, and the eye focuses on the display itself. In order to provide a clear, focused image, optics placed between the eye and the display make the display appear farther away than the display may actually be in reality. In this way, the eye is capable of focusing beyond the space occupied by the display.

HMDs are generally either too large, have limited resolution, or a combination of both. This is due to the distance between pixels in the display, or pixel pitch. When there is sufficient distance between the display and the eye, pixel pitch does not impact resolution to a great extent, as the space between pixels is not as noticeable. However, HMDs place displays near the eye, making pixel pitch an important limiting factor related to resolution. In order to increase resolution, larger displays are necessary to increase the number of pixels in the display. Larger displays require larger optics to create the illusion of space between the eye and the display.

Traditionally, the display in a HMD is a 2D surface projecting a 2D image to each eye. Some HMDs utilize waveguides in an attempt to simulate 3D images. Waveguides, however, are complex, requiring precise design and manufacture to avoid errors in beam angle and beam divergence.

One solution that provides true three-dimensional images is the use of near-eye light field displays. Similar to light field cameras, a near-eye light field display creates a representation of light as it crosses a plane that provides information not only relating to the intensity of the light, but also to the direction of the light rays. Traditional 2D displays only provide information regarding the intensity of light on a plane. Some light field HMDs under development utilize waveguides with diffractive optical elements in an attempt to synthesize light rays on a plane. However, this approach is complex, requiring precise design and manufacture to avoid errors in light ray angle and divergence.

Figure 1:
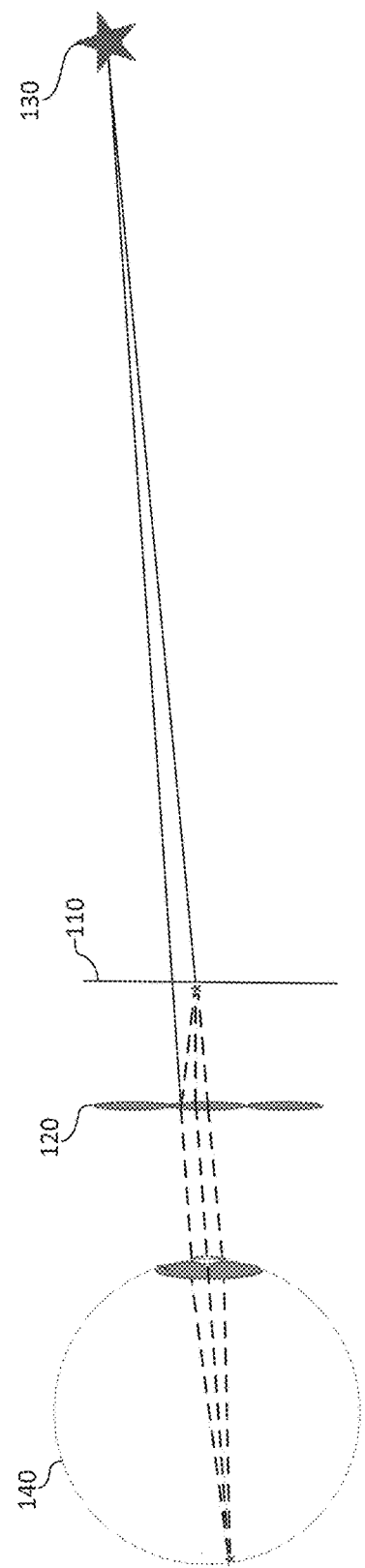
FIG. 1 is an example diagram illustrating the basic theory of near-eye light field displays in accordance with embodiments of the technology described herein.

FIG. 1 illustrates the basic operation of a near-eye light field display 100 in accordance with embodiments of the technology disclosed herein. As illustrated, the near-eye light field display 100 comprises a light source array 110 and an array of lenses 120. Non-limiting examples of a light source array 110 include an LED, OLED, LCD, plasma, laser, or other electronic visual display technology. The array of lenses 120 may comprise a plurality of lenses, each configured to provide a different perspective for objects within each lens's field of view. In some embodiments, array of lenses 120 may comprise a plurality of injection-molded lenses. By capturing multiple views of the same field of view, the direction of the rays of light as they impact the different sections of the lenses are captured, providing an indication of the location and depth of the object within the field of view, represented by the virtual image 130 illustrated in FIG. 1. This virtual image 130 represents the actual position of an object in space, which is beyond the point in space where the light source array 110 is located. The array of lenses 120 enables the eye 140 to focus not on the point in space occupied by the light source 120, but instead to focus on the point in space represented by the virtual image 130. In other words, by utilizing a near-eye light field display, the eyes can "look through" the display and focus on a virtual image 130 beyond the light source (display) 110. Note, however, that divergence of the rays of light is provided by the distance between the light source array 110 and the array of lenses 120. If the spacing between the light source array 110 and the array of lenses 120 is decreased, the divergence of the rays of light will increase, and the virtual image 130 will appear to be closer. Conversely, if the spacing between the light source array 110 and the array of lenses 120 is increased, the divergence of the rays of light will decrease, and the virtual image 130 will appear to be further away. Accordingly, a light field display may be constructed from a traditional HMD by providing a means of adjusting the focus distance between the light source array 110 and the array of lenses 120 according to the desired apparent distance of the virtual image 130. This adjustment in focus distance changes the direction of the rays as required for a light field display. In one embodiment, the focus adjustment is done within the retention time of the eye while different portions of the light source array are lit up so that different portions of the virtual image 130 appear at different distances. In one embodiment, the focus adjustment is done when the focus of the eye changes, as can happen when the user looks at objects that are closer or further away.

Embodiments of the technology disclosed herein are directed toward systems and methods for near-eye light field displays. More particularly, the various embodiments of the technology disclosed herein relate to near-eye light field displays providing enhanced resolution and color depth compared to conventional near-eye light field displays. As will be described in greater detail below, embodiments of the technology disclosed herein enable greater resolution and color by laterally moving a light source array, such as an LED or OLED display, while controlling the intensity of the light source array in synchronization with a scan pattern. Scanning the light source array while modulating the intensity of the pixels reduces the impact of pixel pitch, resulting in increased resolution without the need for larger displays or optics. In one embodiment, the intensity modulation of the pixels is achieved by turning the pixels on and off for a time duration that is dependent on the desired intensity. For example, if higher intensity is desired on a red pixel than on a blue pixel, the red pixel would be lit up longer than the blue pixel. Moreover, various embodiments employ a lightfield display with enhanced resolution and 3D images without the need for complicated waveguides.

By employing embodiments of the systems and methods described below, it is possible to reduce the size and/or enhance the resolution and color of traditional HMDs, or convert a traditional HMD into a light field display.

Figure 4B:
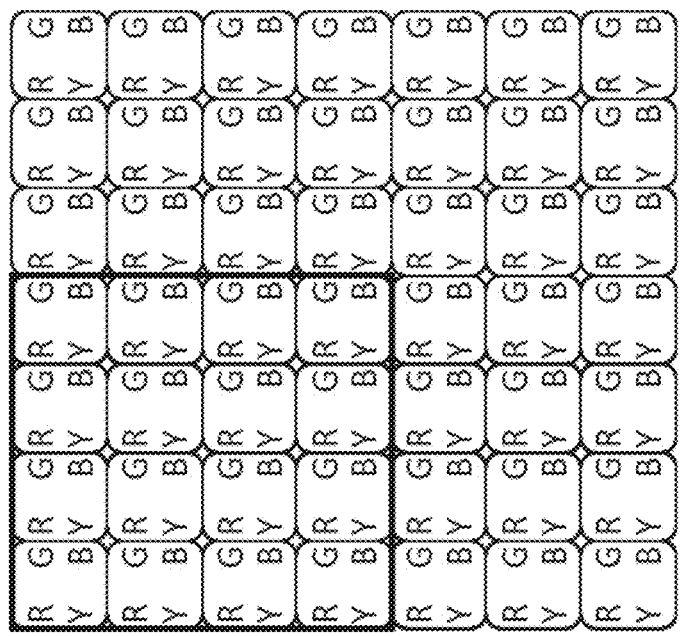
FIGS. 4A and 4B illustrate and example scan pattern and enhanced resolution in accordance with embodiments of the technology disclosed herein.
Figure 4A:
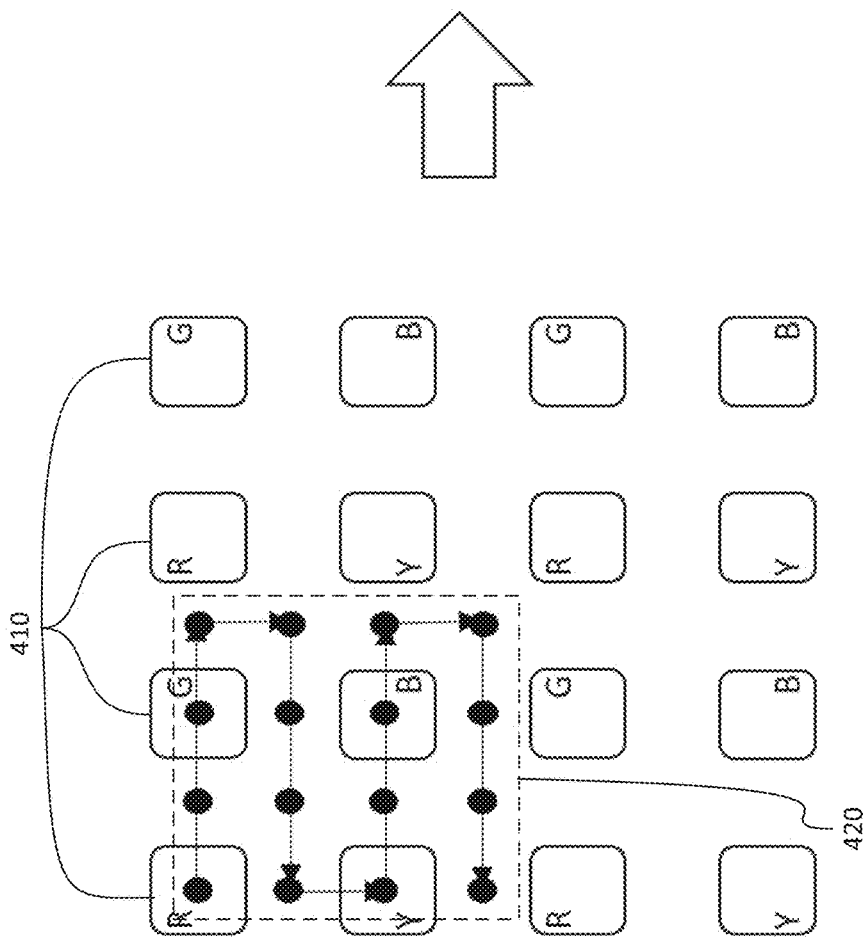

As discussed above, various embodiments of the technology disclosed herein utilize synchronized illumination of the display during scanning while moving the light source array to eliminate the space between pixels. FIGS. 4A and 4B illustrate scanning of a light source array in accordance with embodiments of the technology disclosed herein. FIG. 4A illustrates a light source array comprising four different colored pixels 410 (red, blue, green, and yellow). In the illustrated embodiment of FIG. 4A, the display is moved in a raster scan pattern 420. As the display is scanned, the light sources are turned on and off in a synchronized pattern. The type of scan pattern utilized in different embodiments may be taken into account when computing the synchronized pattern. As illustrated in FIG. 4A, each pixel is translated to be illuminated near each black dot in the pattern 420, essentially turning each individual pixel into a 4×4 mini-display. Other embodiments may employ other scan patterns 420, such as a 3×3 pattern or a 2×2 pattern. In general, the scan pattern can be any desired Lissajous or similar figure obtained by having a different frequency of repetition (not necessarily sinusoidal) for the scan in the x axis and the scan in the orthogonal y axis. By scanning every pixel in accordance with the scan pattern 420, each mini 4×4 display overlaps the others, creating a virtual display having full color superposition (i.e., each color is represented by each pixel position). This is illustrated in FIG. 4B. Moreover, the number of pixels per inch is increased by a factor of 16, resulting in higher resolution without the need to utilize a larger display having a greater number of pixels per inch. If the display originally has a VGA resolution with 640 by 480 pixels, the scanning converts it into a display with 2,560 by 1,920 pixels, two times better than 1080p resolution. The overall increase in resolution is proportional to the number of scan points included within the scan pattern 420.

Figure 3:
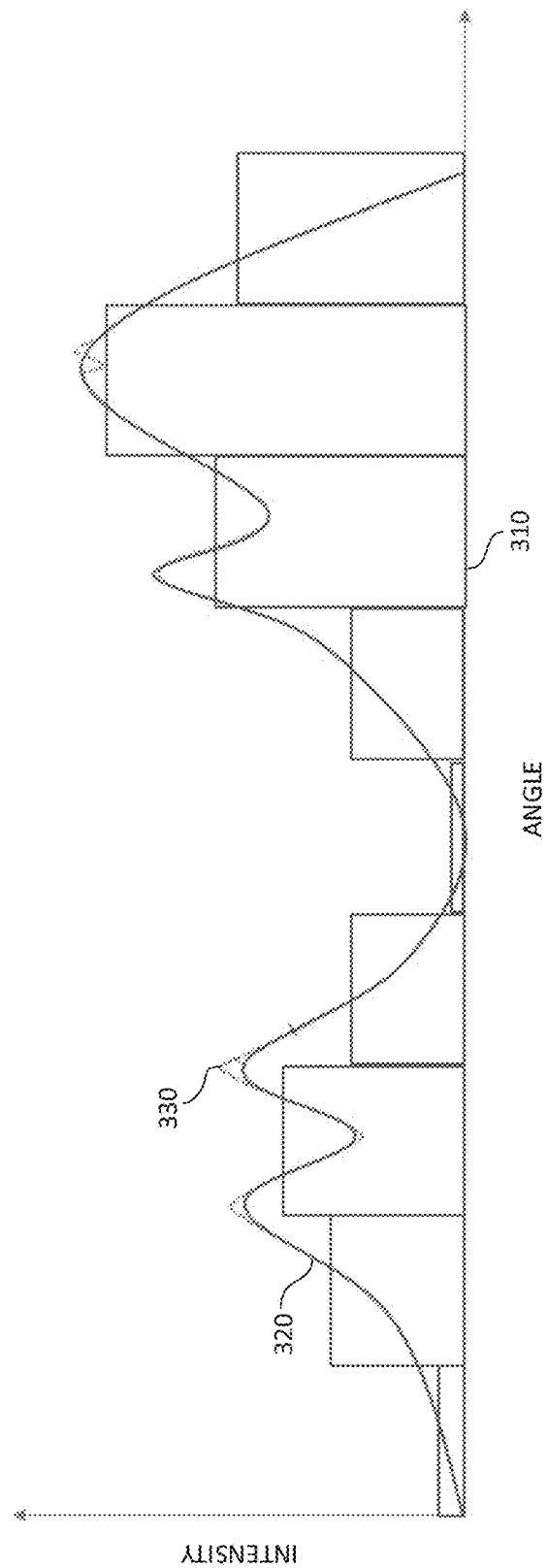
FIG. 3 is an diagram illustrating the enhanced resolution capable in accordance with embodiments of the technology disclosed herein.

FIG. 3 illustrates the benefits of scanning a light source array in accordance with the example scan pattern of FIGS. 4A and 4B. The Y-axis indicates the intensity of light from a light source, such as a light source array, while the X-axis indicates the angle of the light. Angle is shown because the human eye detects intensity as a function of angle. With traditional displays, such as LED displays, as the light is modulated, the intensity of the light changes as a function of angle in discrete steps, as illustrated by blocks 310 of FIG.

3. Each step represented by blocks 310 represents one pixel in the fixed display. The figure shows the case for a display with 100% fill factor where there is no space between pixels. In other embodiments, the display may have a fill factor less than 100%, leaving a gap between pixels with zero intensity. The intensity as a function of angle with a fixed display is pixelated, meaning there are discrete steps in intensity in the transition from one pixel to the next that are of sufficiently low angular resolution as to be perceivable by the eye. By moving the display, however, the convolution of the pixel pitch and the change in angle of the modulated light produces a smoother curve 320, indicating greater resolution. This results in enhanced resolution, as can be appreciated when compared to the desired resolution indicated by 330. Some embodiments may result in near perfect resolution. In various embodiments, the intensity modulation for each pixel may itself be digitized rather than continuous, but there is still significant improvement in resolution compared with the fixed display.

Figure 9:
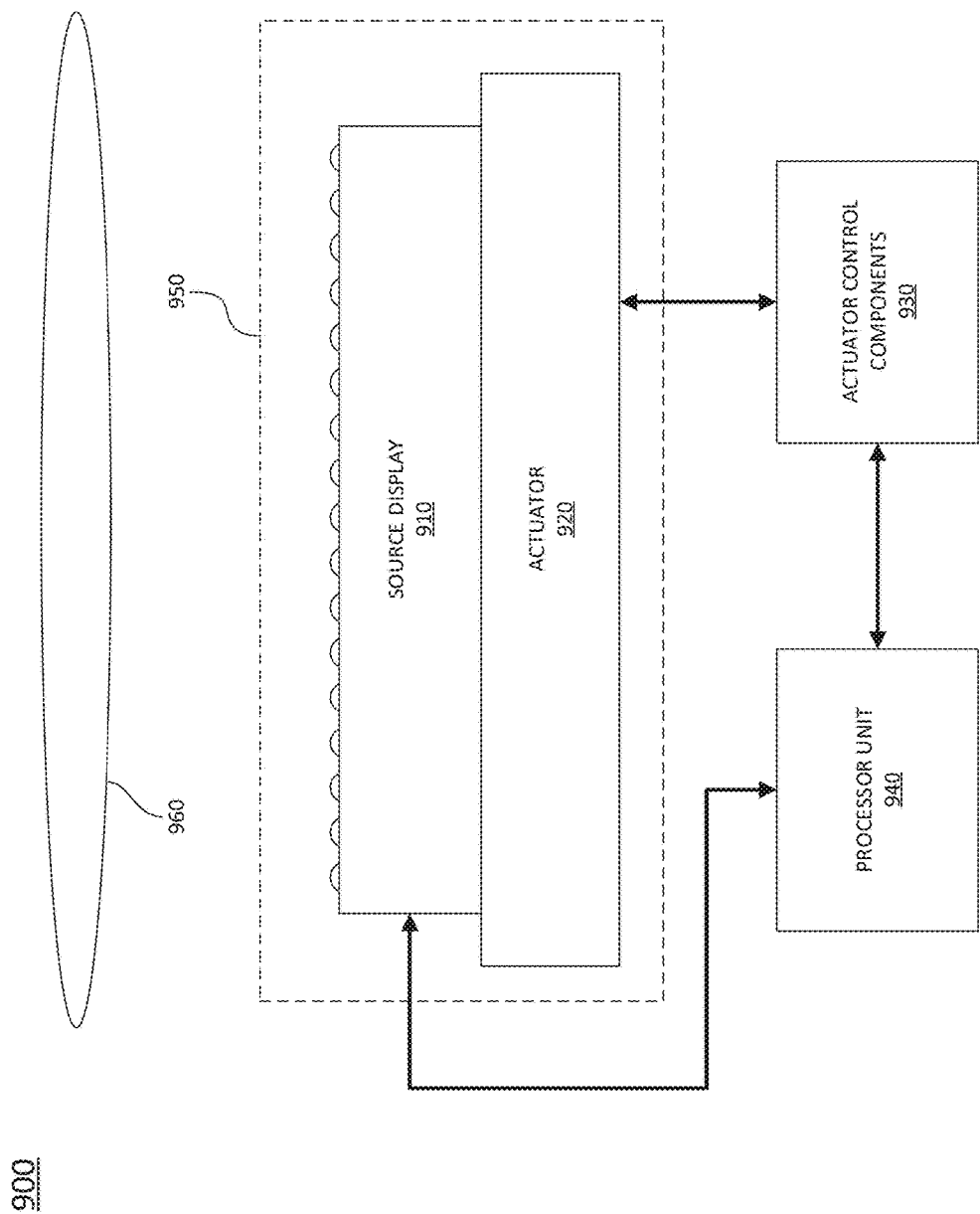
FIG. 9 illustrates an example improved near-eye display system in accordance with embodiments of the technology disclosed herein.

FIG. 9 illustrates an example improved near-eye display system 900 in accordance with embodiments of the technology disclosed herein. The improved near-eye display system 900 may be implemented in a plurality of different HMD solutions, and could also be used to improve traditional HMD units to provide greater resolution without the need for larger displays or optics. As illustrated in FIG. 9, improved near-eye display system 900 includes one or more display components 950. Each display component includes a light source array 910. Non-limiting examples of a light source array 910 include an LED, OLED, LCD, plasma, or other electronic visual display technologies. A processor unit 940 may be connected to the light source array 910 to control the illumination of the pixels of the light source array 910. In some embodiments the processor unit 940 may include one or more of a microprocessor, memory, a field programmable gate array (FPGA), and/or display and drive electronics. A light field lens 960 is disposed between the display component 950 and the human eye (not pictured).

The light source array 910 may be disposed on one or more actuators 920. In various embodiments, the one or more actuators 920 may include one or more of: voice coil motors ("VCMs"); shape memory alloy ("SMA") actuators; piezoelectric actuators; MEMS actuators; a combination thereof; among others. In some examples, the one or more actuators 920 may comprise a MEMS actuator similar to the MEMS actuator disclosed in U.S. patent application Ser. No. 14/630,437, filed Feb. 24, 2015, the disclosure of which is hereby incorporated herein by reference in its entirety. Non-limiting examples of material for connecting the light source array 910 to the one or more actuators 920 include: epoxy; solder; metal pastes; wire bonding; among others. To control the actuators 920, the improved near-eye display system 900 may include actuator control components 930, including electronics for controlling the actuators 920 and sensors identifying the position of the actuators 920. In various embodiments, the actuator control components 930 may be communicatively coupled to the processor unit 940 so that illumination of the light source array 910 may be synchronized with the movement of the one or more actuators 920.

The improved near-eye display system 900 is capable of enhancing spatial resolution of images, i.e., how closely lines can be resolved in an image. In terms of pixels, the greater the number of pixels per inch ("ppi"), the clearer the image that may be resolved. When operated in accordance with the scan pattern discussed with respect to FIGS. 4A and 4B, the resolution of HMDs employing the improved near-eye display system 900 can achieve greater resolution than a traditional display of the same size. This enables enhanced HMDs without the need for larger displays and optics and, accordingly, larger form factors for the HMDs.

Figure 2:
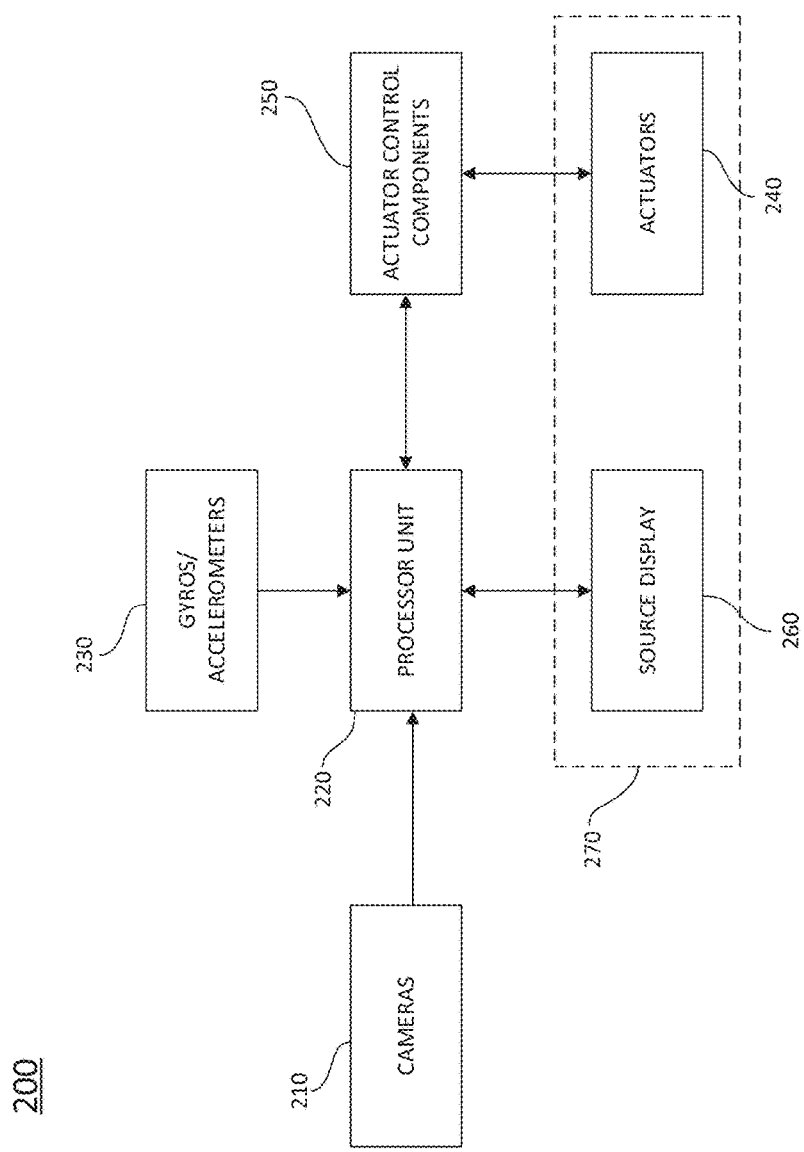
FIG. 2 is an example light field system in accordance with embodiments of the technology disclosed herein.

The improved near-eye display system discussed with respect to FIG. 9 may be employed in a light field system, such as the example light field system 200 illustrated in FIG. 2. The light field system 200 is designed to provide an enhanced 3D representation of a scene in a user's field of view, mimicking transparent eyeglasses. Although discussed with respect to this example embodiment, after reading the description herein it will become apparent to one of ordinary skill in the art that the disclosed technology can be implemented in any of a number of different HMD applications.

As discussed above, FIG. 2 illustrates an example light field system 200 in accordance with embodiments of the technology disclosed herein. The light field system 200 includes one or more cameras 210, a processor unit 220, gyrometers/gyroscopes and/or accelerometers 230, one or more actuators 240 and actuator control components 250, and a light source array 260. The one or more cameras 210 may be directed to capture a user's field of view. In some embodiments, the one or more cameras 210 may be light field cameras, which are designed to capture a light field representation of the field of view of the camera (i.e., the light of the images are broken up by an array of lenses disposed in front of an image sense to capture both intensity and direction of the light). Other embodiments may utilize other image sensors as the one or more cameras 210, such as traditional video cameras. In such embodiments, the one or more traditional cameras would capture a series of pictures at different focal depths.

The images from the one or more cameras 210 may be fed into processor unit 220 to compute the actual image at different depths based on the captured images. For example, where a traditional camera is used, the images from the one or more cameras 210 may comprise a series of pictures at different focal depths. To create the three dimensional actual image, the different captured images are processed to provide depth to the actual image.

To achieve enhanced resolution, the light field system 200 may include one or more display components 270, similar to the display components 950 discussed with respect to FIG. 9. In some embodiments, the display components 270 may include an array of lenses (not pictured), similar to the array of lenses 120 discussed with respect to FIG. 1. In other embodiments, the array of lenses may be disposed between the eye and the display components 270. Various embodiments may include an array of lenses for each eye, i.e., a left eye array and a right eye array.

The captured light field discussed above with respect to the one or more cameras 210 is utilized to compute a sequence for a driver associated with the light source array 260, indicating when the plurality of light sources comprising the light source array 260 should be turned on. In some embodiments, the light field system 200 may include one or more gyroscopes or accelerometers 230, providing information representative of the particular position of the user's head. Furthermore, the images captured by the cameras may be processed to determine the motion of the user's head as well. This information may be fed into the processor unit 220 to utilize in computing the light field to account for changes in the position of the user's head.

To provide depth to the image, one or more actuators for scanning the light source array in the Z-direction may be included. By scanning in the Z-direction, the generated light field may be provided at the proper focus. Scanning in the Z-direction may be incorporated into the scan pattern of FIGS. 4A and 4B such that the depth of the image may be provided to the eye, enabling the eye to focus at a variety of depths beyond the surface in space occupied by the light source array. In some embodiments, different colored pixels may be turned on at different focal positions, accounting for chromatic aberrations due to the difference in focal length of each wavelength of the colored pixels. Chromatic aberration may be caused by the human eye, the lens array, or both. In some embodiments, the array of lenses utilized in the system may include doublets, diffraction grating, or other optical techniques for eliminating aberrations.

Figure 5:
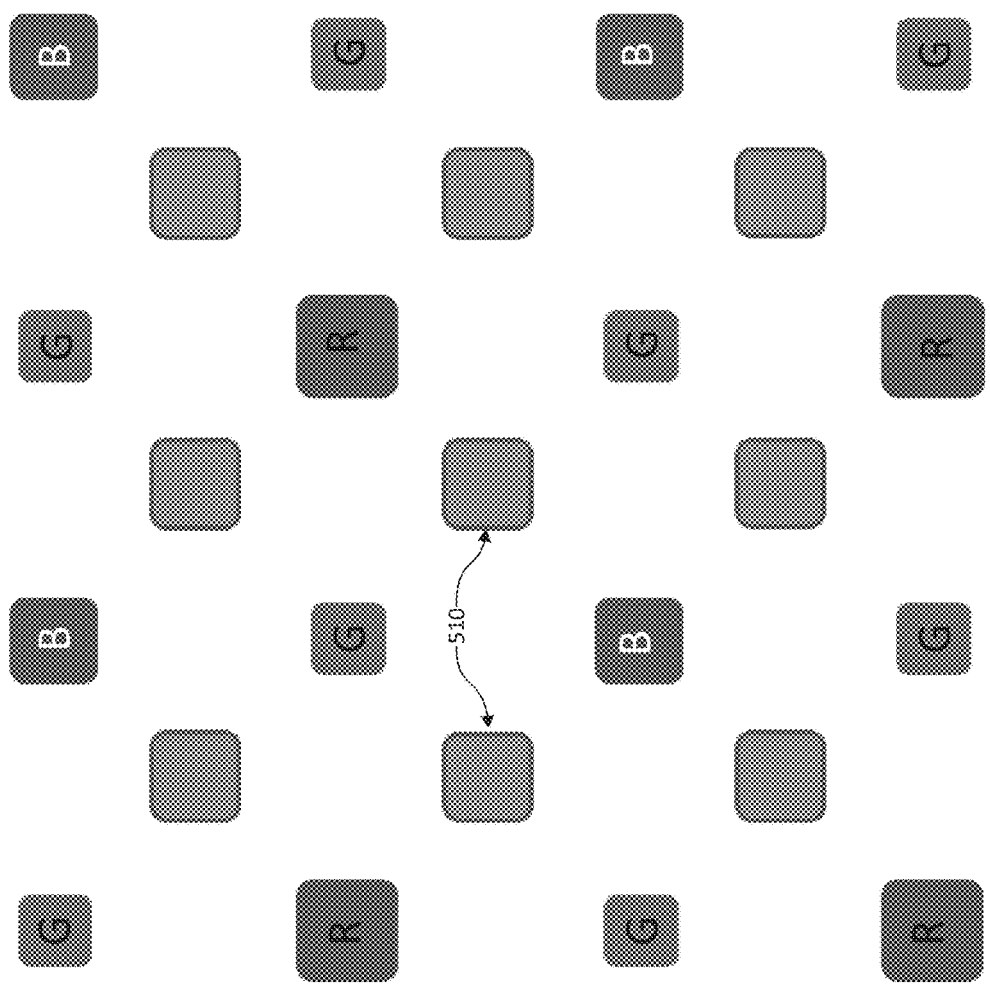
FIG. 5 is an example display configuration having one or more focus sensors disposed in between pixels of the display in accordance with embodiments of the technology disclosed herein.

Another benefit of scanning the display is the ability to include different sensors within the display without sacrificing resolution. FIG. 5 illustrates an example display configuration 500 in accordance with embodiments of the technology disclosed herein. As illustrated, the display configuration 500 includes pixels in three colors (blue, red, and green). Dispersed in between the colored pixels are sensors 510. Each sensor 510 may be configured to scan a small portion of the eye. The scanning by each sensor 510 may follow the same scan pattern as discussed above with respect to FIGS. 4A and 4B. The sensors 510 may pick up differences in the light reflected by different portions of the eye, distinguishing between the iris, pupil, and the whites of the eyes. In some embodiments, the sensors 510 may be used to determine the light reflected from the retina. The light reflected from the retina may be used to determine the focus of they eye. For example, when the eye is focused at the current position of the display, the light from the display forms a small point on the retina. The reflected light similarly forms a small dot on the display surface where the sensors are located. In one embodiment, the focus of the eye is determined by measuring the size and/or position of the reflected spot from the retina on the display surface. In some embodiments, the sensors 510 may distinguish between different parts of the eye based on the light reflected or refracted off the eye. As the sensors are disposed in the space in between pixels, the scanning of the display in accordance with the scan pattern allows for the same proportional increase in resolution while still including sensors 510 in the display configuration 500.

In order to ensure that images are processed within the persistence of vision of the human eye, scanning in the three dimensions may need to occur at high frequency. For example, in some embodiments the focus scan (Z-direction) may be provided by a 25 Hz frequency triangle wave to ensure a 50 Hz update rate for the entire image. Accordingly, the lateral scan (X-Y plane) may require a 500 Hz frequency scan in the X-axis and 5 kHz scan in the Y-axis to ensure that the entire image is displayed within one depth of focus. In some embodiments, the frequency of X-Y scanning may be reduced by simplifying the design.

Figure 6:
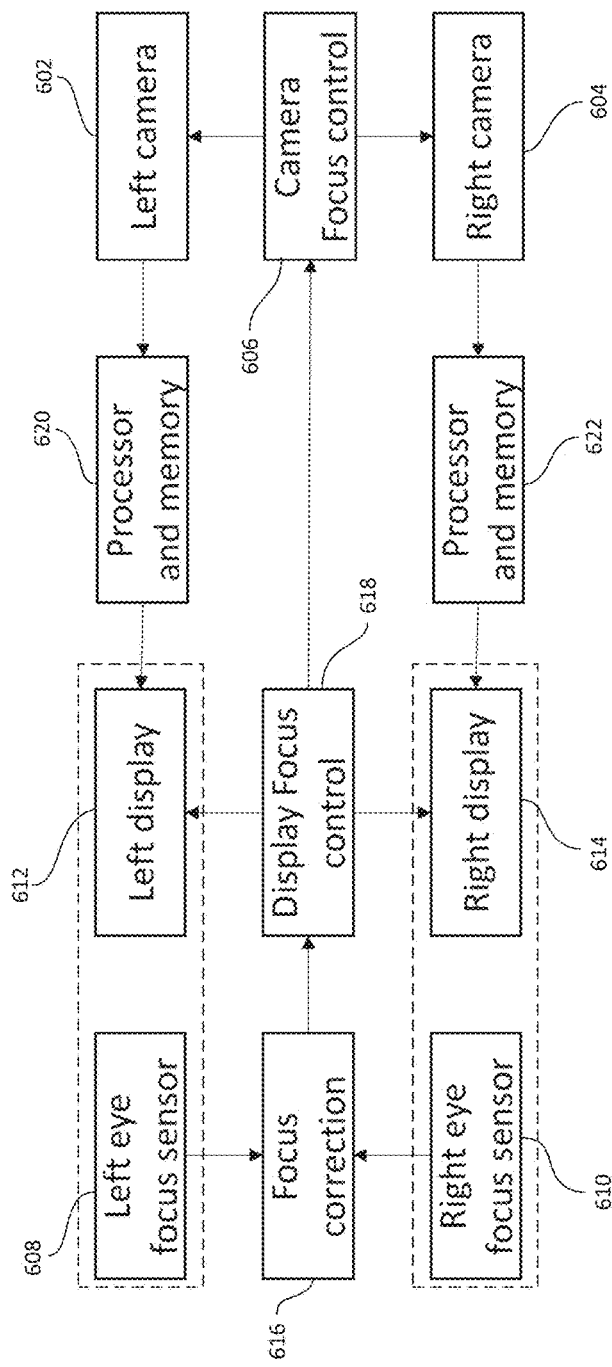
FIG. 6 illustrates an example basic light field system in accordance with embodiments of the technology disclosed herein.

To reduce the complexity associated with three-axis scanning as described above with respect to the light field system of FIG. 2, a basic light field system may be employed, in which only the light field for objects that are in focus is displayed, thereby limiting the need for Z-direction scanning. FIG. 6 is an example basic light field system 600 in accordance with embodiments of the technology disclosed herein. As illustrated in FIG. 6, the basic light field system 600 includes at least two cameras, a left camera 602 and a right camera 604. Each camera is configured to provide an image stream to a particular eye, left and right. In many embodiments, the left camera 602 and right camera 604 may include a motorized focus such that the focus of each camera 602, 604 can be changed dynamically. The focus of each camera 602, 604 may be controlled by a camera focus control 606. In some embodiments, each camera 602, 604 may have an independent camera focus control 606, respectively.

The focus of each camera 602, 604 may be controlled based on the focus of the user's eyes. The basic light field system 600 may include eye focus sensors 608, 610 disposed within a display in front of the left eye and right eye, respectively. Each eye focus sensor 608, 610 may include one or more focus sensors in various embodiments. In some embodiments, the eye focus sensors 608, 610 may be disposed in the spaces between the pixels of a left display 612 and a right display 614. The eye focus sensors 608, 610 may be used to determine where a user's eyes are focused. The information from the eye focus sensors 608, 610 may be fed into a focus correction module 616. The focus correction module 616 may determine the correct focus based on the point where the user's eyes are focused, and provide this information to a display focus control 618. The display focus control 618 may provide this information to the camera focus control 606. The camera focus control 606 may utilize the focus information from the display focus control 618 to set the focus of each camera 602, 604. The vision of a user with eye focus problems (myopia or hyperopia, nearsighted or farsighted) can be corrected by setting the focus of the cameras to a different depth than the focus of the display. In some embodiments, the cameras 602, 604 may be one or more of a light field camera, a standard camera, an infrared camera, or some other image sensor, or a combination thereof. For example, in some embodiments the cameras 602, 604 may comprise a standard camera and an infrared camera, enabling the basic light field system 600 to provide both a normal view and an infrared view to the user.

The display focus control 618 may also utilize the desired focus from the focus correction module 616 to set the focus of the displays 612, 614, to the focus of each eye.

Once the cameras 602, 604 are set to the desired focus, the cameras 602, 604 may capture the scene within the field of view of each camera 602, 604. The images from each camera 602, 604 may be processed by a processor unit 620, 622. As illustrated, each camera 602, 604 has its own processor unit 620, 622, respectively. In some embodiments, a single processor unit may be employed for both cameras 602, 604. The processor unit 620, 622 may process the images from each camera 602, 604 in a similar fashion as described above with respect to FIG. 2. For example, the processor unit 620, 622 may compute a light field for use in computing a sequence to turn on different light sources on each display 612, 614 to provide a greater resolution during scanning of the displays 612, 614. The images are displayed to each eye via the displays 612, 614, respectively, in accordance with the light field sequence computed by the processor unit 620, 622. In some embodiments, this pseudo-light field display may be provided without scanning of the displays 612, 614. In such embodiments, although the resolution of the image may not be enhanced, a light field may still be generated and presented to the eyes.

Although illustrated as separate components, aspects of the basic light field system 600 may be implemented as in a single component. For example, the focus correction 616, the display focus control 618, and the camera focus control 606 may be implemented in software and executed by a processor, such as processor unit 620, 622.

Figure 7:
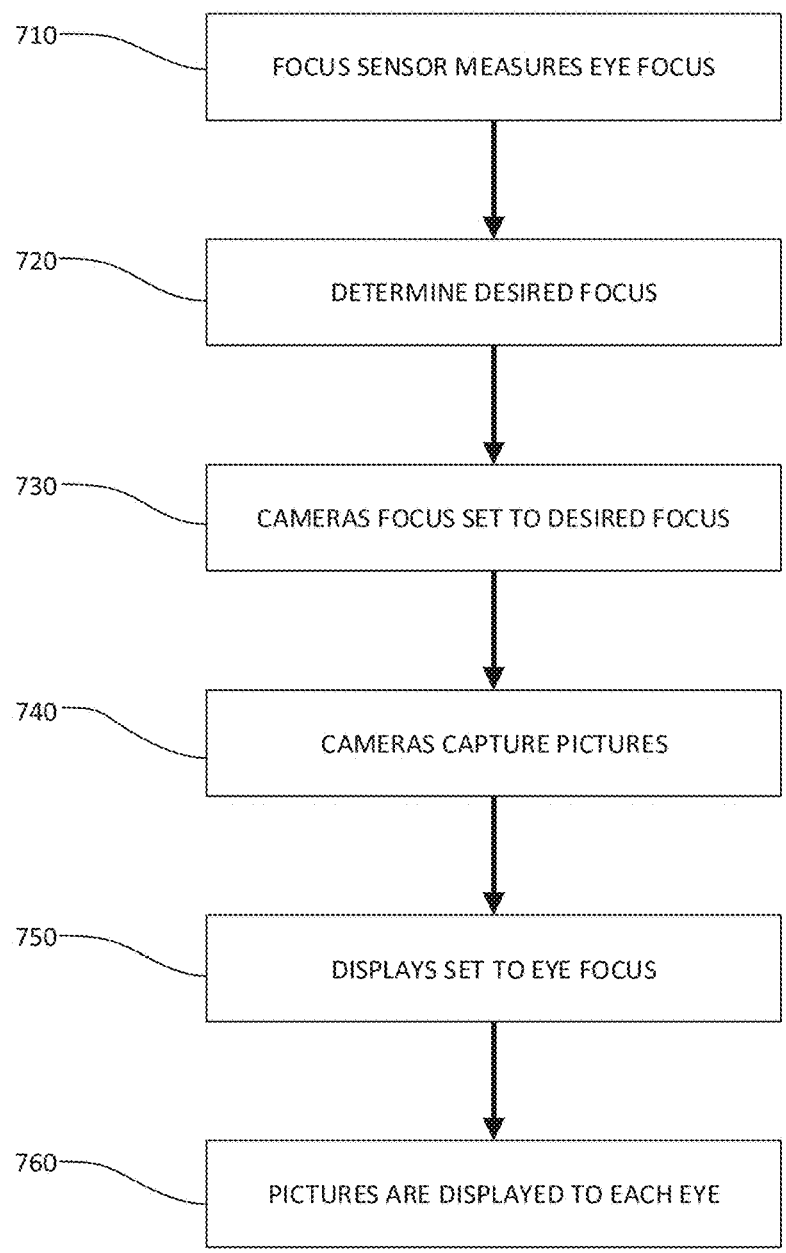
FIG. 7 is an example process flow in accordance with embodiments of the technology disclosed herein.

FIG. 7 illustrates an example process flow 700 in accordance with embodiments of the technology disclosed herein. The process flow 700 is applicable for embodiments similar to the basic light field system 600 discussed with respect to FIG. 6. At 710, one or more focus sensors measure the eye focus of the user. The measurement may be performed by one or more sensors disposed on a display placed in front of each eye in some embodiments. The eye focus sensors may be disposed in the space between pixels of each display in various embodiments, similar to the configuration discussed above with respect to FIG. 5.

At 720, a desired focus is determined. The desired focus is determined based on the measured eye focus from 710. The desired focus may be different from the eye focus if the user has focus problems. For example, if the user has myopia (nearshightedness), the desired focus is further away than the measured eye focus. The desired focus may also be determined from the position of the eye, such as close if looking down, or the position of the eye with respect to the image, such as the same focus as a certain object in the scene, or some of other measurement of the eye. Based on the desired focus, the camera focus may be set to the desired focus at 730. In various embodiments, the camera focus may be set equal to the desired focus. In other embodiments, the camera focus may be set to a focus close to, but not equal to, the desired focus. In such embodiments, the camera focus may be set as close as possible based on the type of camera employed in the embodiment.

At 740, the cameras capture images of objects within the field of view of the cameras. In some embodiments, the field of view of the cameras may be larger than the displayed field of view to enable some ability to quickly update the display when there is rapid head movement, without the need for capturing a new image.

At 750, each display is set to the eye focus. In some embodiments, the eye focus is the same as the desired focus. In other embodiments, the desired focus is derived from the eye focus identified at 710. In some embodiments, the displays may be set to the eye focus before setting the camera focus at 730, after 730 but before the camera captures images at 740, or simultaneous to the actions at 730 and/or 740.

At 760, the images are displayed to each eye. The images are displayed to each eye via the respective display. In some embodiments, the images may be processed by a processor unit prior to being displayed, similar to the processing discussed above with respect to FIG. 6. In some embodiments, the images may be combined with computer generated images to generate an augmented reality image.

Figure 8:
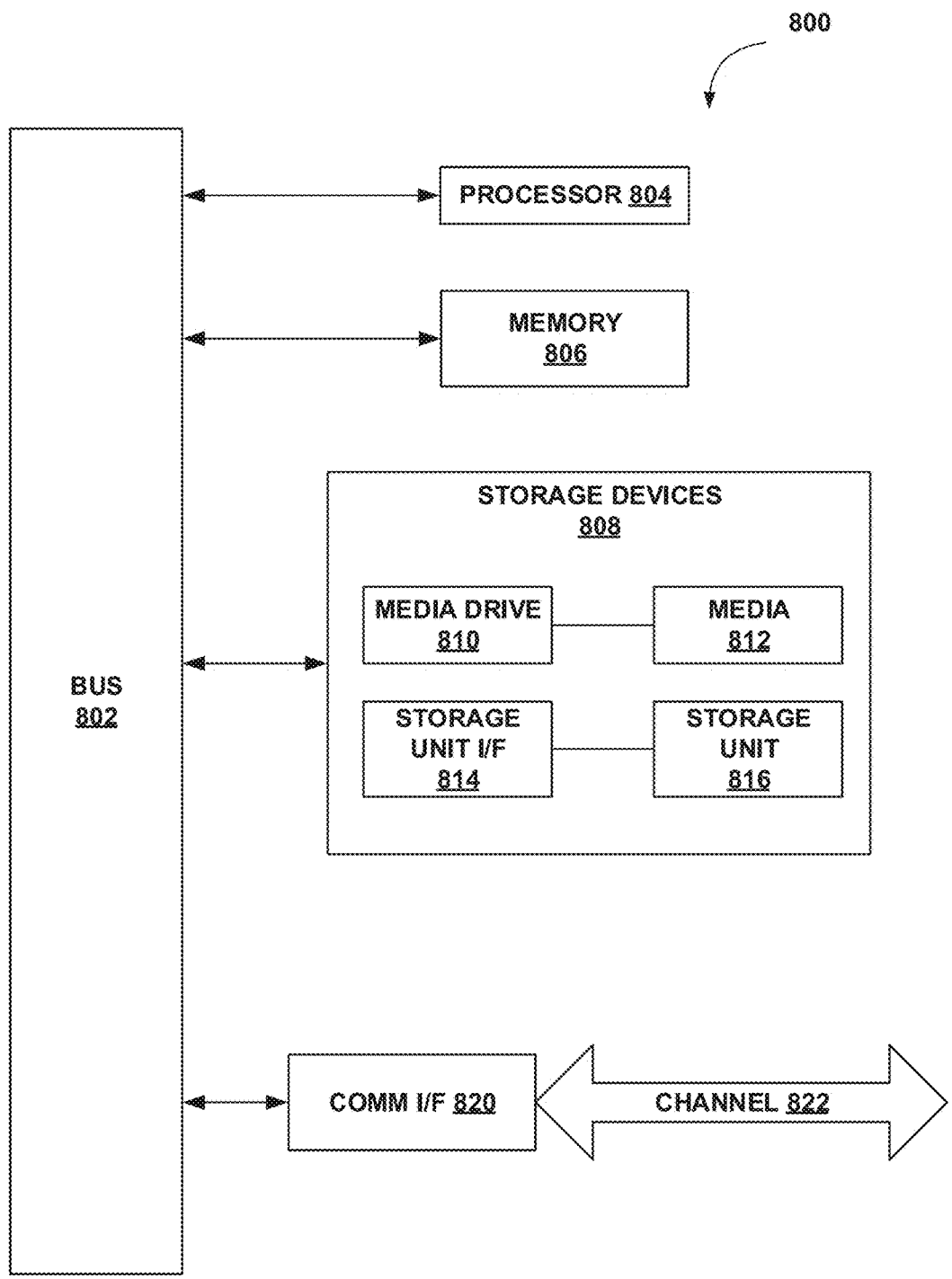
FIG. 8 illustrates an example computing module that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the technology are implemented in whole or in part using software, in one embodiment, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the technology using other computing components or architectures.

Referring now to FIG. 8, computing component 800 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing component 800 or to communicate externally.

Computing component 800 might also include one or more memory components, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A near-eye display system, comprising:
a display component, comprising a light source array disposed on one or more actuators, the light source array comprising a focus sensor;

an actuator control component communicatively coupled to the one or more actuators; and a processor unit communicatively coupled to the light source array and the actuator control component;

wherein the focus sensor is disposed on the surface of the display component between at least two pixels of a plurality of pixels of the display component wherein the focus sensor measures an eye focus of a user's eyes wherein the light source array is connected with the one or more actuators such that the one or more actuators are capable of moving the light source array in accordance with a scan pattern, and the processor unit is configured to synchronize the illumination of a plurality of pixels of the light source array with the scan pattern.

2. The near-eye display system of claim 1, wherein the light source array comprises one of: an LED; an OLED; an LCD; a plasma display.

3. The near-eye display system of claim 1, further comprising one or more lenses disposed in front of the light source array.

4. The near-eye display system of claim 1, wherein the scan pattern comprises a raster scan pattern configured to scan the one or more actuators laterally.

5. The near-eye display system of claim 1, wherein the scan pattern results in a Lissajous curve.

6. The near-eye display system of claim 1, further comprising one or more cameras having a field of view encompassing a portion of a view of a user, and wherein the processor is further configured to compute a light field representation.

7. The near-eye display system of claim 6, wherein the one or more cameras comprise one or more light field cameras.

8. The near-eye display system of claim 6, wherein the one or more cameras comprises a motorized focus.

9. The near-eye display system of claim 6, wherein the scan pattern comprises a raster scan pattern configured to scan the one or more actuators laterally, and a depth scan pattern configured to scan the one or more actuators in the Z-axis.

10. The near-eye display system of claim 1, comprising two of the display components, and further comprising:

a focus correction module communicatively coupled to the focus sensors of each of the two display components and configured to determine a desired focus;

a display focus control communicatively coupled to the focus correction module and configured to set a focus of the light source array of each of the two display components; and a camera focus control communicatively coupled to the one or more cameras and configured to set a focus of each of the one or more cameras based on the desired focus.

11. The near-eye display system of claim 1, wherein the system comprises a head mounted display.

12. A method, comprising:

using one or more focus sensors to measure an eye focus of a user's eyes, wherein each of the one or more focus sensors is on a surface of a first display or a surface of a second display, wherein the focus sensor is disposed on the surface of the display component between at least two pixels of a plurality of pixels of the display component determining by a focus correction module a desired focus based on the eye focus measured using the one or more focus sensors;

setting a focus of a first camera and a second camera based on the desired focus;

capturing images within a field of view of the first camera and the second camera;

processing the captured images to generate processed images;

setting a focus of the first display and the second display; and providing the processed images to the first display and a second display;

wherein the first display is disposed in front of a first eye of the user and the second display is disposed in front of a second eye of the user.

13. The method of claim 12, wherein the first display and the second display comprise one of: an LED; an OLED; an LCD; a plasma display.

14. The method of claim 12, wherein processing the captured images to generate the processed images comprises computing a light field representation of the captured images, and computing a sequence pattern for turning on and off a plurality of light sources disposed on the first display and the second display.

15. The method of claim 14, wherein processing the captured images to generate the processed images further comprising computing a sequence pattern for turning on and off a plurality of light sources disposed on the first display and the second display.

16. The method of claim 14, wherein the sequence pattern comprises a raster scan pattern.

17. The method of claim 12, wherein the one or more cameras comprises a motorized focus and setting the focus of the first camera and the second camera comprises setting the motorized focus to a capture focus.

18. The method of claim 17, wherein the capture focus is equal to the desired focus.

19. The method of claim 17, wherein the capture focus is different than the desired focus.

20. The method of claim 12, wherein providing the processed images to the first display and the second display comprises scanning the first display and the second display via one or more actuators configured to laterally scan each of the first and second displays.

21. A method of enhancing image resolution in a head mounted display comprising a light source array, the method comprising:

using a focus sensor between two pixels on a surface of the light source array to measure a focus of an eye;

determining a desired focus using the focus of the eye;

setting a focus of a head mounted camera using the desired focus;

using the head mounted camera to capture images within a field of view of the head mounted camera;

processing the captured images to generate processed images, wherein the processed images are generated using one or more of:

illumination control for the light source array;

focal depths associated with the captured images; and a sequence for a driver associated with the light source array;

setting a focus of the display using the focus of the eye; and providing the processed images using the display.

* * * * *